United States Patent
Sodagar

(10) Patent No.: US 12,058,191 B2
(45) Date of Patent: Aug. 6, 2024

(54) PROCESSING MODEL FOR DASH CLIENT PROCESSING MODEL TO SUPPORT HANDLING OF DASH EVENT UPDATES

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/301,596

(22) Filed: Apr. 17, 2023

(65) Prior Publication Data
US 2023/0336603 A1 Oct. 19, 2023

Related U.S. Application Data

(60) Provisional application No. 63/332,596, filed on Apr. 19, 2022, provisional application No. 63/332,599, filed on Apr. 19, 2022.

(51) Int. Cl.
*H04L 65/65* (2022.01)
*H04L 67/02* (2022.01)

(52) U.S. Cl.
CPC ............. *H04L 65/65* (2022.05); *H04L 67/02* (2013.01)

(58) Field of Classification Search
CPC . H04L 67/02; H04L 65/612; H04N 21/26258; H04N 21/435
See application file for complete search history.

(56) References Cited

U.S. PATENT DOCUMENTS

| | | |
|---|---|---|
| 2012/0207088 A1 | 8/2012 | Liu et al. |
| 2013/0060911 A1 | 3/2013 | Nagaraj et al. |
| 2017/0026437 A1 | 1/2017 | Wang |
| 2019/0149857 A1 | 5/2019 | Lo et al. |
| 2020/0137137 A1 | 4/2020 | Rehan et al. |
| 2020/0366971 A1 | 11/2020 | Sodagar |
| 2022/0329641 A1* | 10/2022 | Giladi .............. H04N 21/23424 |

OTHER PUBLICATIONS

DASH-IF Implementation Guidelines: DASH events and timed metadata tracks timing and processing model and client reference model, Jul. 10, 2020 DASH Industry Forum Version 1.0.2 (Final), pp. 1-21 (Year: 2020).*

(Continued)

*Primary Examiner* — Chirag R Patel
(74) *Attorney, Agent, or Firm* — Crowell & Moring LLP

(57) ABSTRACT

Methods, apparatus, and computer readable storage medium for processing a media stream. A method may include receiving a DASH event associated with the DASH media stream; determining that the DASH event is an update to a previously received DASH event; and processing the DASH event based on a dispatching mode of the DASH event; wherein the DASH event comprises at least one of: an inband event transmitted along with a first media slice in a content set, the content set comprising one or more media slices; a Media Presentation description (MPD) event; or a timed metadata sample; wherein the dispatching mode of the DASH event comprising an on-receive mode and an on-start mode.

20 Claims, 9 Drawing Sheets

(56) References Cited

OTHER PUBLICATIONS

Information technology—Dynamic adaptive streaming over HTTP (DASH)—Part 1 : Media presentation description and segment formats, Oct. 4, 2021, 332 pages.
Text of ISO/IEC 23009-1 4th edition DAM 2 PrePeriod, nonlinear playback and other extensions, Feb. 5, 2022, 43 pages.
International Search Report and Written Opinion in International Patent Application No. PCT/US23/65938 dated Sep. 21, 2023, 11 pages.

* cited by examiner

| Active Event Table 1 | scheme_uri + value pair 1 | Event 1 | Event 2 | ... | ... | Event l |
|---|---|---|---|---|---|---|
| Active Event Table 2 | scheme_uri + value pair 2 | Event 1 | Event 2 | ... | ... | Event m |
| ⋮ | | | | ⋮ | | |
| Active Event Table k | scheme_uri + value pair k | Event 1 | Event 2 | ... | ... | Event n |

| Dispatched Event Table 1 | scheme_uri + value pair 1 | Event 1 | Event 2 | ... | ... | Event l |
|---|---|---|---|---|---|---|
| Dispatched Event Table 2 | scheme_uri + value pair 2 | Event 1 | Event 2 | ... | ... | Event m |
| ⋮ | | | | ⋮ | | |
| Dispatched Event Table x | scheme_uri + value pair x | Event 1 | Event 2 | ... | ... | Event n |

*FIG. 4*

Common Process

The DASH Client implements the following Common process:

i.   The DASH Client sets up an Active Event Table for each subscribed *scheme_uri/(value)* in the case of *dispatch_mode = on_start*. The Active Event Table maintains a single list of event ids that are waiting to be dispatched. The DASH Client also sets up an Dispatched Event Table for each subscribed scheme_uri/(value). The Dispatched Event Table maintains a single list of 'emsg' *ids* that have been dispatched.

ii.  Parse the 'emsg'/timed metadata sample and retrieve *scheme_uri/ (value)*.

iii. If Application is not subscribed to the *scheme_uri/(value)* pair, end the processing of this 'emsg'.

iv.  Derive the event instance/metadata sample's *ST* v.   Derive the ending time *ET= ST + DU*.

*FIG. 5a*

On-receive Processing

The DASH Client implements the following On-receive processing:

i.    If the current presentation time value is greater than $ET$, then end processing.

ii.    Compare the event's *id* with the entries of the Dispatched Event Table Identified by the same *scheme_uri/(value)* pair as the event:
        If an entry with the identical *id* value exists, end processing.

iii.    Dispatch the event/timed metadata, including *ST, id, DU, timescale,* and *message_data*, and add the event to the Corresponding Dispatched Event Table (i.e., Dispatched Event Table Identified by the same *scheme_uri/(value)* pair as the event/metadata sample).

*FIG. 5b*

On-start Processing

The DASH Client implements the following process when *dispatch_mode = on_start*:

i. If the event is an update, remove any event, if any, with identical *scheme_uri* (*value*) and *id* from the Active Event Table.

ii. Retrieve/derive the event instance/metadata sample's *ST* iii. If the current media presentation time value is smaller than *ST*, then go to step vi.

iv. Derive the ending time *ET= ST + DU*.

v. If the current presentation time value is greater than *ET*, then end processing.

vi. Compare the event's *id* with the entries of the Active Event Table and Dispatched Event Table of the same *scheme_uri*(*value*) pair:
- If an entry with the identical *id* value exists in either table, end processing;
- If not, add 'emsg''s *id* to the corresponding Active Event Table.

vii. Dispatch the event/metadata message_data at time ST, or immediately if the current presentation time is larger than ST. Remove the event, if any exists, from the Active Event Table and add it to Dispatched Event Table.

*FIG. 5c*

PROCESSING MODEL FOR DASH CLIENT PROCESSING MODEL TO SUPPORT HANDLING OF DASH EVENT UPDATES

INCORPORATION BY REFERENCE

This application is based on and claims the benefit of priority to U.S. Provisional Application No. 63/332,599 filed Apr. 19, 2022; and U.S. Provisional Application 63/332,596 filed Apr. 19, 2022, each of which is herein incorporated by reference in its entirety.

TECHNICAL FIELD

This disclosure generally relates to media streaming technologies including Dynamic Adaptive Streaming over Hypertext transfer protocol (DASH). More specifically, the disclosed technology involves methods and apparatuses for handling DASH event updates under DASH client processing model.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. In the DASH standard, a media presentation description (MPD) is used to provide information for a DASH client to adaptively stream media content by downloading media segments from a DASH server. The DASH standard allows the streaming of multi-rate content. One aspect of the DASH standard includes carriage of MPD events and inband events, and a client processing model for handling these events.

SUMMARY

Aspects of the disclosure provide methods and apparatuses for media stream processing and more specifically, for handling DASH event updates under DASH client processing model. In some example implementations, a method for processing a media stream, such as a DASH media stream is disclosed. The method may include receiving a DASH event associated with the DASH media stream; determining that the DASH event is an update to a previously received DASH event; and processing the DASH event based on a dispatching mode of the DASH event; wherein the DASH event comprises at least one of: an inband event transmitted along with a first media slice in a content set, the content set comprising one or more media slices; a Media Presentation description (MPD) event; or a timed metadata sample; wherein the dispatching mode of the DASH event comprising an on-receive mode and an on-start mode.

Aspects of the disclosure also provide a media stream processing device or apparatus including a circuitry configured to carry out any of the method implementations above.

Aspects of the disclosure also provide non-transitory computer-readable mediums storing instructions which when executed by a computer for media stream processing cause the computer to perform any of the method implementations above.

BRIEF DESCRIPTION OF THE DRAWINGS

Further features, the nature, and various advantages of the disclosed subject matter will be more apparent from the following detailed description and the accompanying drawings in which:

FIG. 4 shows example Active Event Tables and Dispatched Event Tables.

FIG. 5a shows example common processing for updated event in a DASH event processing model.

FIG. 5b shows example on-receive processing for updated event in a DASH event processing model.

FIG. 5c shows example on-start processing for updated event in a DASH event processing model.

DETAILED DESCRIPTION OF EMBODIMENTS

Figure 1:
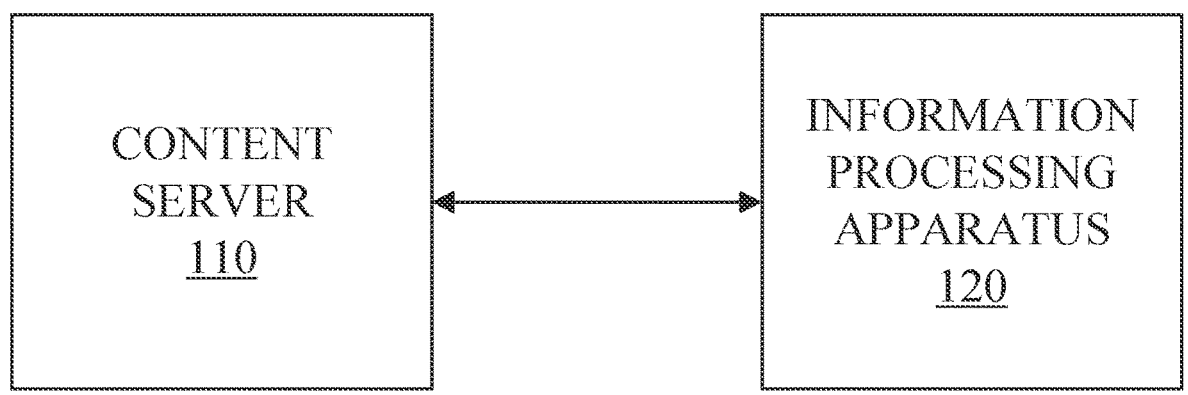
FIG. 1 illustrates a system according to an embodiment of the present disclosure.

Dynamic Adaptive Streaming Over Hypertext Transfer Protocol (DASH) and Media Presentation Description (MPD)

One popular format for media streaming include Dynamic adaptive streaming over hypertext transfer protocol (DASH), as defined in ISO/IEC 23009-1. DASH is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD may be in the form of an Extensible Markup Language (XML) document. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by, for example, a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods. In example implementations, the MPD is offered such that a next period is a continuation of content in a previous period, possibly the immediately following period or in a later period (e.g., after an advertisement period has been inserted).

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI).

In example implementations, a URL can be defined as an <absolute-URI> according to IETF RFC 3986, for example, with a fixed scheme of "http" or "https", possibly restricted by a byte range if a range attribute is provided together with the URL. The byte range can be expressed as byte-range-spec as defined in IETF RFC 2616, for example. It can be restricted to a single expression identifying a contiguous range of bytes. In an embodiment, the segment can be included in the MPD with a data URL, for example as defined in IETF RFC 2397.

The MPD file can provide the identifiers for each segment. In some examples, the MPD file can also provide byte ranges in the form of a range attribute, which can correspond to the data for a segment within a file accessible by the URL, URN, or URI.

Sub-representations can be embedded (or contained) in regular representations and described by a sub-representation element (e.g., SubRepresentation). The sub-representation element can describe properties of one or several media content components that are embedded in the representation. For example, the sub-representation element can describe properties of an embedded audio component (e.g., codec, sampling rate, etc.), an embedded sub-title (e.g., codec), or the sub-representation element can describe some embedded lower quality video layer (e.g., some lower frame rate, etc.). Sub-representation and representation elements can share some common attributes and elements.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some example implementations, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

DASH Event

In a DASH system, an event provides a means for signaling additional information to a DASH client and its associated application(s). In example implementations, events are timed and therefore have a start time and duration. The event information may include metadata that describes content of the media presentation. Additionally or alternatively, the event information may include control messages for a media player that are associated with specific times during playback of the media presentation, such as advertisement insertion cues. The event may be implemented as, for example, MPD event, or inband event. They can be a part of the manifest file (e.g., MPD) or be embedded in an ISOBMFF-based media files, such as an event message (emsg) box.

Media presentation description (MPD) events are events that can be signaled in the MPD. A sequence of events assigned to a media presentation time can be provided in the MPD on a period level. Events of the same type can be specified by an event stream element (e.g., EventStream) in a period element. Events terminate at the end of a period even if the start time is after the period boundary or duration of the event extends beyond the period boundary. The event stream element includes message scheme identification information (e.g., @schemeIdUri) and an optional value for the event stream element (e.g., @value). Further, as the event stream contains timed events, a time scale attribute (e.g., @timescale) may be provided to assign events to a specific media presentation time within the period. The timed events themselves can be described by an event element included in the event stream element.

Inband event streams can be multiplexed with representations by adding event messages as part of media segments. The event streams may be present in selected representations, in one or several selected adaptation sets only, or in all representations. For example, one possible configuration is one where only the audio adaptation sets contain inband events, or only the video adaptation sets contain inband events. An inband event stream that is present in a representation can be indicated by an inband event stream element (e.g., InbandEventStream) on various levels, such as an adaptation set level, or a representation level. Further, one representation can contain multiple inband event streams, which are each indicated by a separate inband event stream elements.

FIG. 1 illustrates a system (100) according to an embodiment of the present disclosure. The system (100) includes a content server (110) and an information processing apparatus (120). The content server (110) can provide a content stream, including primary content (e.g., a main program) and one or more timed metadata tracks.

The information processing apparatus (120) can interface with the content server (110). For example, the information processing apparatus (120) can play back content received from the content server (110). The playback of the content can be performed based on a manifest file (e.g., an MPD) received by the information processing apparatus (120) (e.g., from the content server (110)). The manifest file can further include signaling for the one or more timed metadata tracks.

Figure 2:
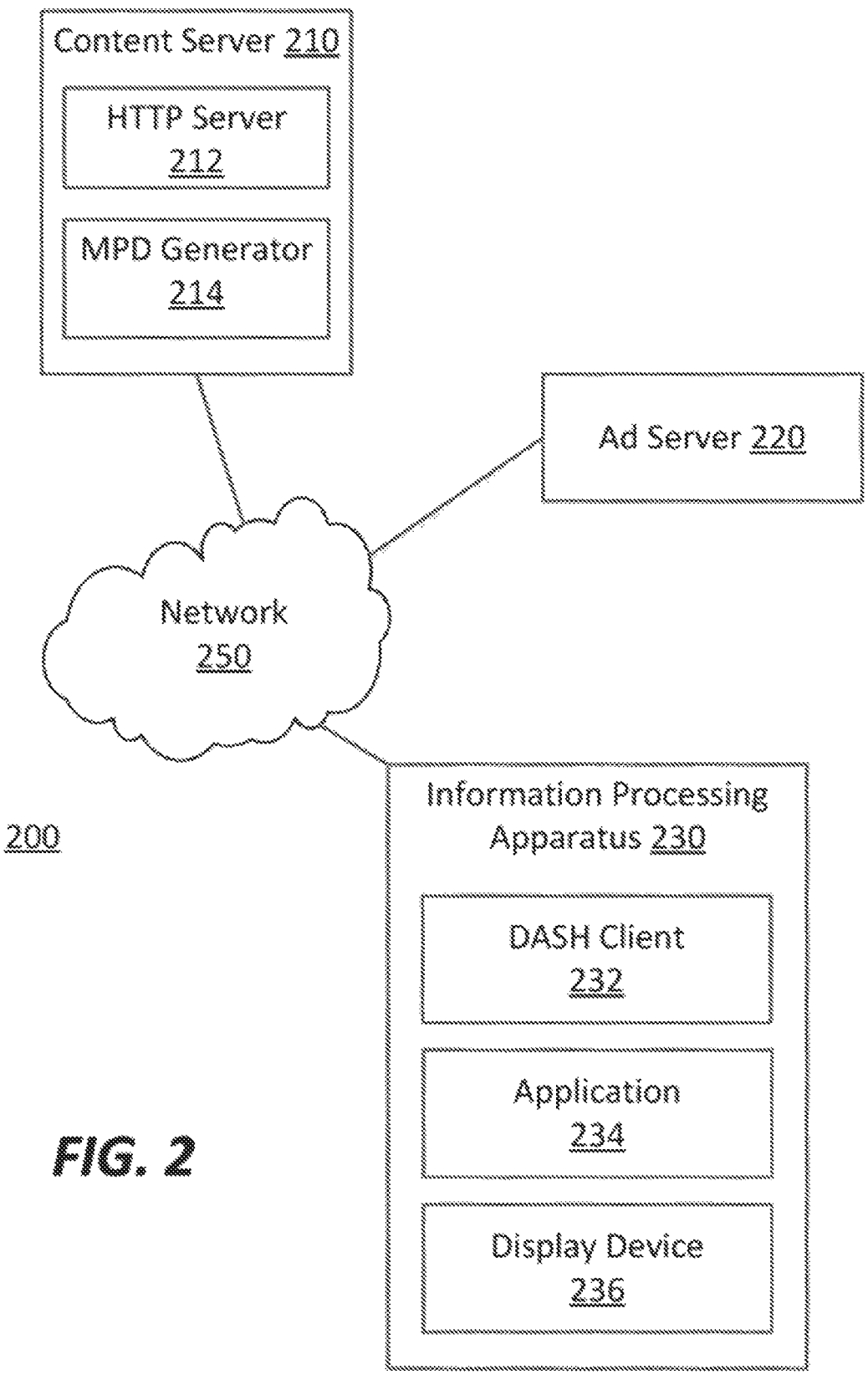
FIG. 2 illustrates a Dynamic Adaptive Streaming over HTTP (DASH) system according to an embodiment of the present disclosure.

An exemplary DASH system is illustrated in FIG. 2. The DASH system (200) can include a content server (210), an advertisement server (220), and an information processing apparatus (230) which are connected to a network (250). The DASH system (200) can also include one or more supplemental content servers.

The content server (210) can provide primary content (e.g., a main program) and a manifest file (e.g., an MPD), to the information processing apparatus (230). The manifest file can be generated by the MPD generator (214) for example. The primary content and the manifest file can be provided by different servers in other embodiments.

The information processing apparatus (230) receives the MPD and can acquire primary content from an HTTP server (212) of the content server (210) based on the MPD. The MPD can be processed by a DASH client (232) executed on the information processing apparatus (230). Further, the DASH client (232) can acquire advertisement content from the advertisement server (220), or other content (e.g., interactive content) from one or more supplemental content servers. The main content and the advertisement content can be processed by the DASH client (232) and output for display on a display device (236). The display device (236) can be integrated in, or external to, the information processing apparatus (230). Further, the DASH client (232) can extract event information from one or more timed metadata tracks and send the extracted event information to an application (234) for further processing. The application (234) can be configured, for example, to display supplemental content based on the event information.

The advertisement server (220) can store advertisement content in advertisement storage, such as a memory. The information processing apparatus (230) can request the stored advertisement content based on the event information.

Figure 3:
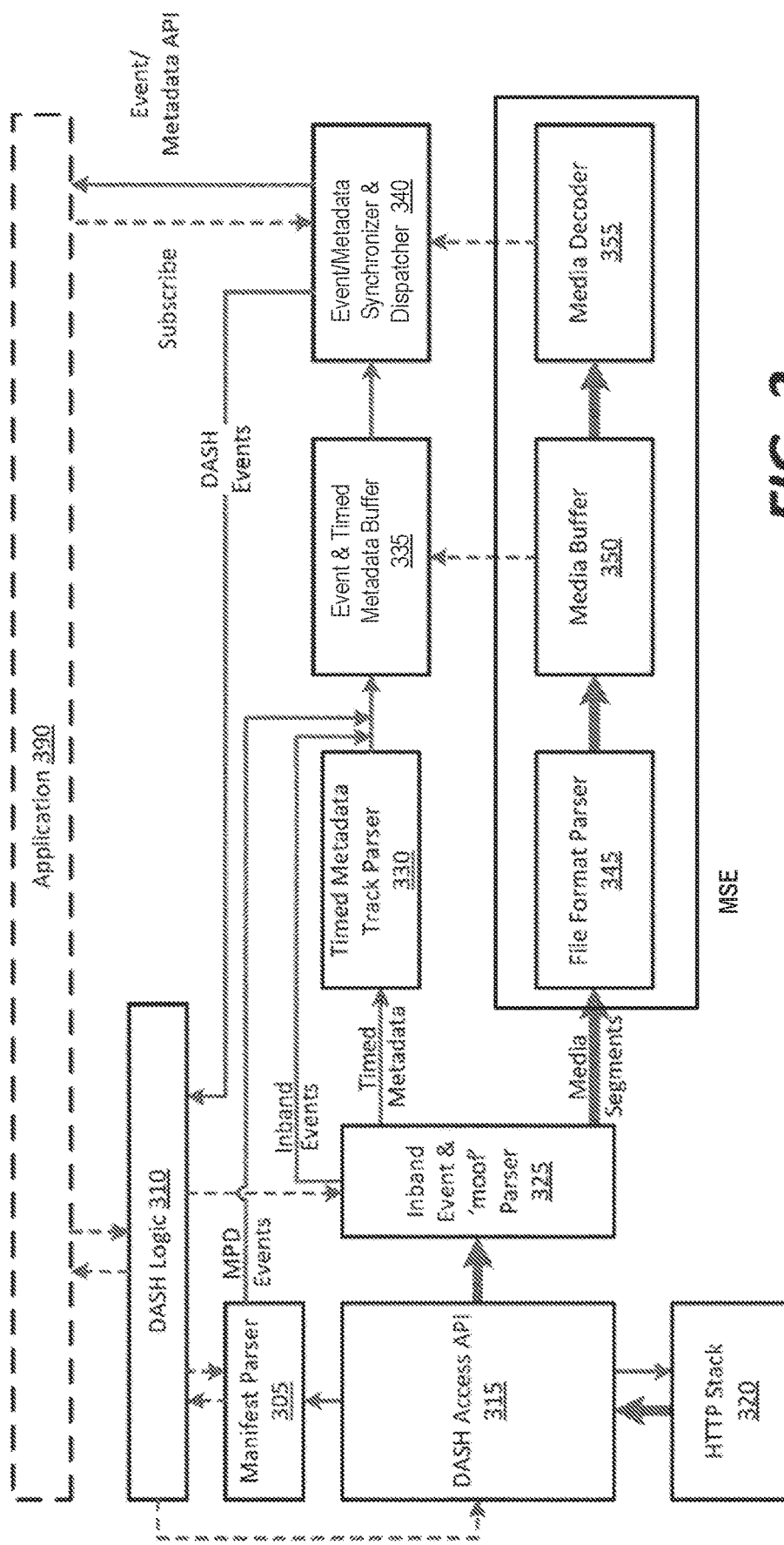
FIG. 3 illustrates a DASH client architecture according to an embodiment of the present disclosure.

FIG. 3 illustrates an example DASH client architecture for processing DASH events according to an embodiment of the present disclosure. The DASH client (or DASH player) can be configured to communicate with an application (390) and process various types of events, including (i) MPD events, (ii) inband events, and (iii) timed metadata events.

A manifest parser (305) parses a manifest (e.g., an MPD). The manifest is provided by the content server (110, 210), for example. The manifest parser (305) extracts event information about MPD events, inband events, and timed metadata events embedded in timed metadata tracks. The extracted event information can be provided to DASH logic (310) (e.g., DASH player control, selection, and heuristic logic). The DASH logic (310) can notify an application (390) of event schemes signaled in the manifest based on the event information.

The event information can include event scheme information for distinguishing between different event streams. The application (390) can use the event scheme information to subscribe to event schemes of interest. The application (390) can further indicate a desired dispatch mode for each of the subscribed schemes through one or more subscription APIs. For example, the application (390) can send a subscription request to the DASH client that identifies one or more event schemes of interest and any desired corresponding dispatch modes.

If the application (390) subscribes to one or more event schemes that are delivered as part of one or more timed metadata tracks, an inband event and 'moof' parser (325) can stream the one or more timed metadata tracks to a timed metadata track parser (330). For example, the inband event and 'moof' parser (325) parses a movie fragment box ("moof") and subsequently parses the timed metadata track based on control information from the DASH logic (310).

The timed metadata track parser (330) can extract event messages embedded in the timed metadata track. The extracted event messages can be stored in an event and timed metadata buffer (335). A synchronizer/dispatcher module (340) (e.g., event and timed metadata synchronizer and dispatcher) can dispatch (or send) the subscribed events to the application (390).

MPD events described in the MPD can be parsed by the manifest parser (305) and stored in the buffer (335). For example, the manifest parser (305) parses each event stream element of the MPD, and parses each event described in each event stream element. For each event signaled in the MPD, event information such as presentation time and event duration can be stored in the buffer (335) in association with the event.

The inband event and 'moof' parser (325) can parse media segments to extract inband event messages. Any such identified inband events and associated presentation times and durations can be stored in the buffer (335).

Accordingly, the buffer (335) can store therein MPD events, inband events, and/or timed metadata events. The buffer (335) can be a First-In-First-Out (FIFO) buffer, for example. The buffer (335) can be managed in correspondence with a media buffer (350). For example, as long as a media segment exists in the media buffer (350), any events or timed metadata corresponding to that media segment can be stored in the buffer (335).

A DASH Access Application Programming Interface (API) (315) can manage the fetching and reception of a content stream (or dataflow) including media content and various metadata through an HTTP protocol stack (320). The DASH Access API (315) can separate the received content stream into different dataflows. The dataflow provided to the inband event and moof parser can include media segments, one or more timed metadata tracks, and inband event signaling included in the media segments. In an embodiment, the dataflow provided to the manifest parser 305 can include an MPD.

The DASH Access API (315) can forward the manifest to the manifest parser (305). Beyond describing events, the manifest can also provide information on media segments to the DASH logic (310), which can communicate with the application (390) and the inband event and moof parser (325). The application (390) can be associated with the media content processed by the DASH client. Control/synchronization signals exchanged among the application (390), the DASH logic (310), the manifest parser (305), and the DASH Access API (315) can control the fetching of media segments from the HTTP Stack (320) based on information regarding media segments provided in the manifest.

The inband event and moof parser (325) can parse a media dataflow into media segments including media content, timed metadata in a timed metadata track, and any signaled inband events in the media segments. The media segments including media content can be parsed by a file format parser (345) and stored in the media buffer (350).

The events stored in the buffer (335) can allow the synchronizer/dispatcher (340) to communicate to the application the available events (or events of interest) related to the application through an event/metadata API. The application can be configured to process the available events (e.g., MPD events, inband events, or timed metadata events) and subscribe to particular events or timed metadata by notifying the synchronizer/dispatcher (340). Any events stored in the buffer (335) that are not related to the application, but are instead related to the DASH client itself can be forwarded by the synchronizer/dispatcher (340) to the DASH logic (310) for further processing.

In response to the application (390) subscribing to particular events, the synchronizer/dispatcher (340) can communicate to the application event instances (or timed metadata samples) corresponding to event schemes to which the application has subscribed. The event instances can be communicated in accordance with a dispatch mode indicated by the subscription request (e.g., for a specific event scheme) or a default dispatch mode. For example, in an on-receive dispatch mode, event instances may be sent to the application (390) upon receipt in the buffer (335). On the other hand, in an on-start dispatch mode, event instances may be sent to the application (390) at their associated presentation time, for example in synchronization with timing signals from the media decoder (355).

In some example implementations, the DASH Player processes the received MPD. For every Period, the MPD may include one or more Event Streams. Each Event Stream may be scoped by a scheme/value pair). Each period may include one or more Adaptation Sets that carry Representations/tracks for timed metadata. Some or all of these event streams/timed metadata tracks may be suitable for consumption by the application.

The DASH Player-specific Events are dispatched to DASH Player's Control, Selection & Heuristic Logic (FIG. 3, DASH logic 310), while the Application-related Events and timed metadata track samples are dispatched to the application as the following. If an Application is subscribed to a specific event stream or timed metadata stream, the corresponding event instances or timed metadata samples may be dispatched to the application according to the dispatch mode:

For on-receive dispatch mode, the DASH client (or DASH player) should dispatch the entire event or timed metadata information on or before the Latest Arrival Time (LAT), or at the earliest time possible. An application receiving the event has from the LAT to the start time (ST) of the event to prepare for the event. In some example implementations, the LAT is the latest time an event should be delivered to an application and is used to ensure the application having enough time to prepare for the event. In some example implementations, the DASH client may dispatch the entire event or timed metadata information as soon as they are appended to the Event and Timed Metadata Buffer.

For on-start dispatch mode, the DASH client (or DASH player) should dispatch the event exactly at ST, which is the start/presentation time of the event/metadata sample. The DASH client (or DASH player) should dispatch the event to the application at the presentation time of the corresponding media sample. In the case an event's start time is passed but the current moment is within the event duration, the DASH client may dispatch the event at the earliest time within the event duration.

In FIG. 3, the file format parser 345, the media buffer 350, and the media decoder 355 may together form an MSE buffer.

MPD Event

Events may be signaled in the MPD. A sequence of events assigned to the media presentation time may be provided in the MPD on Period level. Events of the same type may be summarized in an Event Stream that is specified by an EventStream element in a Period element. Exemplarily, events may terminate at the end of a Period even if the start time is after the Period boundary or duration of the event extends beyond the Period boundary.

In some example implementations, in one period, all events of a same type may be clustered in one Event Stream. A period may have multiple Event Streams, and each Event Stream may have a different combination of: the value of the @schemeIdUri attribute, and the value of the @value attribute.

Table 1 provides an example Event Stream semantics.

TABLE 1

| | | |
|---|---|---|
| Event Stream Semantics | | |
| Element or Attribute Name | Use | Description |
| EventStream | | specifies event Stream |
| @xlink:href | O | specifies a reference to an external EventStream element |
| @xlink:actuate | OD default: onRequest | specifies the processing instructions, which can be either "onLoad" or "onRequest". This attribute shall not be present if the @xlink:href attribute is not present. |

TABLE 1-continued

Event Stream Semantics

| Element or Attribute Name | Use | Description |
| --- | --- | --- |
| @schemeIdUri | M | identifies the message scheme. The string may use URN or URL syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme. |
| @value | O | specifies the value for the event stream element. The value space and semantics must be defined by the owners of the scheme identified in the @schemeIdUri attribute. |
| @timescale | O | specifies the timescale in units per seconds to be used for the derivation of different real-time duration values in the Event elements.<br>If not present on any level, it shall be set to 1. |
| @presentationTimeOffset | OD Default: 0 | specifies the presentation time offset of this Event Stream that aligns with the start of the Period. Any Event contained in this Event Stream is mapped to the Period timeline by using the Event presentation time subtracted by the value of the presentation time offset.<br>This adjustment shall not be applied to Inband event message streams..<br>The value of the presentation time offset in seconds is the division of the value of this attribute and the value of the @timescale attribute. |
| Event | 0 . . . N | specifies one event. For details see Error! Reference source not found..<br>Events in Event Streams shall be ordered such that their presentation time is non-decreasing. |

Key
For attributes: M = mandatory, O = optional, OD = optional with default value, CM = conditionally mandatory
For elements: <minOccurs> . . . <maxOccurs> (N = unbounded)
Elements are bold; attributes are non-bold and preceded with an @.

Table 2 provides an example Event semantics according to an embodiment of this disclosure.

TABLE 2

Event Semantics

| Element or Attribute Name | Use | Description |
| --- | --- | --- |
| Event | | specifies an Event and contains the message of the event. The content of this element depends on the event scheme. The contents shall be either:<br>A string, optionally encoded as specified by @contentEncoding<br>XML content using elements external to the MPD namespace<br>For new event schemes string content should be used, making use of Base 64 encoding if needed.<br>NOTE The schema allows "mixed" content within this element however only string data or XML elements are permitted by the above options, not a combination. |
| @presentationTime | OD default: 0 | specifies the presentation time of the event relative to the start of the Period taking into account the @presentationTimeOffset of the Event Stream, if present.<br>The value of the presentation time in seconds is the division of the value of this attribute and the value of the @timescale attribute.<br>If not present, the value of the presentation time is 0. |
| @duration | O | specifies the presentation duration of the Event.<br>The value of the duration in seconds is the division of the value of this attribute and the value of the @timescale attribute.<br>The interpretation of the value of this attribute is defined by the scheme owner.<br>If not present, the value of the duration is unknown. |

TABLE 2-continued

Event Semantics

| Element or Attribute Name | Use | Description |
|---|---|---|
| @id | O | specifies an identifier for this instance of the event. Events with equivalent content and attribute values in the Event element shall have the same value for this attribute. The scope of the @id for each Event is with the same @schemeIdURI and @value pair. |
| @status | O default: none | specifies the status of event: none: no specific status update: the event is an update of another event with identical values of @scheme_id_uri, @value, and @id fields |
| @contentEncoding | O | specifies whether the information in the body and the information in the @messageData is encoded. If present, the following value is possible: base64 the content is encoded as described in IETF RFC 4648 prior to adding it to the field. If this attribute is present, the DASH Client is expected to decode the message data and only provide the decoded message to the application. |
| @messageData | O | specifies the value for the event stream element. The value space and semantics must be defined by the owners of the scheme identified in the @schemeIdUri attribute. NOTE the use of the message data is discouraged by content authors, it is only maintained for the purpose of backward-compatibility. Including the message in the Event element is recommended in preference to using this attribute. This attribute is expected to be deprecated in the future editions of this document. |

Key
For attributes: M = mandatory, O = optional, OD = optional with default value, CM = conditionally mandatory
For elements: <minOccurs> . . . <maxOccurs> (N = unbounded)
Elements are bold; attributes are non-bold and preceded with an @.

Inband Event Signaling and Event Message Box

In some example implementations, event streams may be multiplexed with Representations by adding the event messages as part of the Segments. The event streams may be present in selected Representations, in one or several selected Adaptation Sets only or in all Representations.

In some example implementations, an inband event stream may be present in a Representation. If it is expected to be processed by the DASH Client, it may be indicated by an InbandEventStream element at the Adaptation Set or Representation level.

The InbandEventStream may be defined based on the semantics for EventStream, as illustrated in Table 1. Further restrictions may be added to InbandEventStream specific semantics.

The Event Message box ('emsg') may be used to provide signaling for generic events related to, for example, the media presentation time. The same semantics as for an event defined in Tables 1 and 2 may apply.

A Media Segment, if based on the ISO BMFF container, may contain one or more event message ('emsg') boxes. If present, an 'emsg' box may be placed as follows:

It may be placed before the first 'moof' box of the segment; or

It may be placed in between any 'mdat' (media data) and 'moof' box. In this case an equivalent 'emsg' with the same id value shall be present before the first 'moof' box of any segment.

In some example implementations, an 'emsg' may be defined as following:

Box Type: Box Type: 'emsg'
Container: Segment
Mandatory: No
Quantity: Zero or more Table 3 shows an example 'emsg' syntax.

```
aligned(8) class DASHEventMessageBox extends FullBox('emsg',
version, flags) {
    if (version==0) {
        string              scheme_id_uri;
        string              value;
        unsigned int(32)    timescale;
        unsigned int(32)    presentation_time_delta;
        unsigned int(32)    event_duration;
        unsigned int(32)    id;
    } else if (version==1) {
        unsigned int(32)    timescale;
        unsigned int(64)    presentation_time;
        unsigned int(32)    event_duration;
        unsigned int(32)    id;
        string              scheme_id_uri;
        string              value;
    }
    unsigned int(8)   message_data[ ];
}
```

Exemplarily, the semantics for the above syntax is described below:

scheme_id_uri is a string that identifies the message scheme. The semantics and syntax of the message_data[ ] are defined by, for example, the owner of the scheme identified. The string may use URN or URL syntax. A URL may resolve to an Internet location, and a location that does resolve may store a specification of the message scheme.

value is a string that specifies the value for the event. The value space and semantics may be defined by the owners of the scheme identified in the scheme_id_uri field.

timescale provides the timescale, in ticks per second, for the event duration and presentation_time_delta or presentation_time fields. The value should be identical to the timescale of a track contained in the carrying Segment. In some implementations, the value should be identical for all events in one Event Stream.

presentation_time_delta provides the Media Presentation time delta of the media presentation time of the event and the earliest presentation time in this segment. If the segment index is present, then the earliest presentation time is determined by the field earliest_presentation_time of the first 'sidx' box. If the segment index is not present, the earliest presentation time is determined as the earliest presentation time of any access unit in the media segment. The timescale is provided in the timescale field.

presentation_time provides the Media Presentation time of the event measured on the Movie timeline, in the timescale provided in the timescale field, and adjusted by InbandEventStream@presentationTimeOffset, in the time scale provided by InbandEventStream@timescale; the value shall not be less than the earliest presentation time of the carrying Segment.

event_duration provides the duration of event in media presentation time. The timescale is indicated in the timescale field. In some example implementations, the value 0xFFFFFFFF indicates an unknown duration. The interpretation of this value must be defined by the owner of the event scheme.

id: a field identifying this instance of the message. The scope of this identifier for each event is with the same scheme_id_uri and value pair. Messages with the same id within the scope of the same scheme_id_uri and value pair are equivalent, i.e. processing of any one event message box with the same id is sufficient.

message_data: body of the message, which fills the remainder of the message box. This may be empty depending on the above information. The syntax and semantics of this field must be defined by the owner of the scheme identified in the scheme_id_uri field.

flags may be a variable with multiple bit fields (e.g., a character with 8 bits). Each bit may be used to indicate a status, a condition, or a type of the emsg. In example implementations, (flags & 1) equal to 1 indicates that the esmg is an update of another esmg with identical values of scheme_id_uri, value, and id fields. "&" is the bitwise OR operator. Other bits in flags may also be selected to indicates that the esmg is an update In a DASH system, in addition to signal an event, it may be beneficial to have the capability to dynamically update an earlier signaled event. For example, the starting time, duration, and/or media content specified by the event may be updated. In some scenarios, there is a breaking news which may be signaled as an event. The news may sometime need to be updated by latest development. Therefore, the event may need to be updated accordingly. In some scenarios, an already scheduled event may need to be removed due to, for example, a schedule update, or a conflict occurs.

In the current DASH system, an updated event is not clearly defined. As a DASH client may be implemented by many different vendors in many different platforms (e.g., operating systems, browsers, etc.), a cross-vendor, or cross platform compatibility can not be achieved. An updated event signaled may not be identified or recognized by a particular DAHS client. Further, the behavior for processing an updated event is also not defined, and this will cause further discrepancy on vendor dependent DASH client implementations.

In this disclosure, various embodiments are described to precisely define and identify an updated event. Some embodiments related to DASH client processing model are described with respect to updated event support, including: monitoring and identifying an updated event, updating event buffer, dispatching the updated events only if the previous events were not dispatched before.

In some example implementations, an MPD updated event is defined. An Event with @status='update' is the updated instance of an event with identical @schemeIdUri, @value, and @id attributes that may have been previously processed by the DASH client. The DASH client may replace the previous event with the updated instance if the previous event has not been dispatched yet. An Event with @status='update' may differ from the previous event except in the following attributes: @schemeIdUri, @value, and @id.

In some example implementations, an Inband updated event is define. An emsg box with (flags &1)=1 (& is the bitwise AND operator) is the updated instance of an emsg box with identical scheme_id_uri, value, and id fields that may have been previously processed by the DASH client. The DASH client may replace the previous event with the updated instance if the previous event has not been dispatched yet. The updated emsg may differ from the previous emsg except in the following fields: scheme_id_uri, value, and id.

In some example implementations, when replacing an event, an old copy of the event, which is stored in the event and timed metadata buffer, may be updated with the updated instance of the event.

In some example implementations, when replacing an event, the presentation time (which may be updated) of the updated event may be checked. The updated event may be added in the event and timed metadata buffer according to its presentation time, and the old event may be deleted from the event and timed metadata buffer. Note that as the presentation time may be updated, the updated event may have a different position in the event and timed metadata buffer.

In this disclosure, the DASH client event processing model is improved to support updated event. For example, when one or more updated versions of an event is received, the DASH client only dispatches the latest event update, and may avoid dispatching old/obsolete event.

As described earlier, the event processing model (hereinafter also referred to as processing model) may handle events of two dispatch modes: an on-receive mode and an on-start mode. The processing model will share a common process that is applicable to both dispatch modes, then use a separate process for each dispatch mode.

Referring to FIG. 3, the application 390 is subscribed to a specific event stream identified by a (scheme_uri/value) pair with a specific dispatch mode, either on-start or on-receive. The scheme may be indicated by, for example, @schemeIdUri attribute (or field) of the EventStream, or scheme_id_uri field as defined in 'emsg'. The common process, as well as dispatch mode dependent process, are described below.

In some example implementations, an EventStream acts as a container for events of same type. The EventStream may be identified by a (scheme id/value) pair, or a scheme id only. The scheme id may include, for example, scheme_id_uri.

Common Process

In some example implementations, the DASH client may set up an Active Event Table for each subscribed EventStream identified by, for example, a (scheme_uri/value) pair. Exemplarily, the Active Event Table may only need to be setup for events with on-start dispatch mode. The Active Event Table maintains a single list of event ids for events that are waiting to be dispatched. FIG. 4 shows example Active Event Table setup. In FIG. 4, there are k Active Event Tables being created, with each table corresponds to a unique (scheme_uri/value) pair. Each table may be implemented as, for example, a list. Each list may maintain a list of event identifiers (e.g., Event@id, 'emsg' id) indicating events that are waiting to be dispatched.

In some example implementations, the DASH client may also set up a Dispatched Event Table for each subscribed EventStream identified by, for example, a (scheme_uri/value) pair. The Dispatched Event Table maintains a single list of event ids for events that have been dispatched. FIG. 4 shows example Dispatched Event Table setup. In FIG. 4, there are x Dispatched Event Tables being created, with each table corresponds to a unique (scheme_uri/value) pair. Each table may be implemented as, for example, a list. Each list may maintain a list of event identifiers (e.g., Event@id, 'emsg' id) identifying events that have been dispatched.

The DASH client parses the event, (e.g., 'emsg'/timed metadata sample) and retrieve scheme_uri/(value).

If Application is not subscribed to the scheme_uri/(value) pair, the DASH client may end the processing of this event. The DASH client will then proceed to derive/retrieve the event instance/metadata sample's Start Time (ST, or presentation time), and derive the event instance/metadata sample's End Time (ET) using the equation ET=ST+DU, where DU is the event duration, which may be signaled in the event.

FIG. 5a shows an example common process logic.

On-Receive Processing

In some example implementations, when the dispatch mode is on-receive, the DASH client may implement the following process.

Step 1: If the current presentation time value is greater than ET of the updated event, then end processing.

Step 2: Check whether the newly received updated event has been dispatched. The DASH client may compare the event's id with the entries of the Dispatched Event Table identified by the same scheme_uri/(value) pair as the updated event. If an entry with the identical id value exists, end processing.

Step 3: Dispatch the event/timed metadata (i.e., updated version in the updated event), including ST, id, DU, timescale, and message_data, and add the event to the corresponding Dispatched Event Table identified by the same scheme_uri/(value) pair as the updated event.

FIG. 5b shows an example on-receive processing logic.

On-Start Processing

In some example implementations, when the dispatch mode is on-start, the DASH client may implement the following example process.

Step 1: If the event is an update, remove staled event (that is to be replaced by the updated event), if any, with identical id from the corresponding Active Event Table identified by same scheme_uri/(value) pair as the updated event.

Step 2: Derive/retrieve the event instance/metadata sample's ST.

Step 3: If the current media presentation time value is smaller than ST, then go to step 6.

Step 4: Derive the event ending time: ET=ST+DU.

Step 5: If the current presentation time value is greater than ET, then end processing.

Step 6: Compare the event's id with the entries of the corresponding Active Event Table and the corresponding Dispatched Event Table (identified by the same scheme_uri/(value) pair as the updated event):

If an entry with the identical event id value exists in either table, end processing; or if an entry with the identical event id value exists in the corresponding Dispatched Event Table, end processing;

Otherwise, add event id (e.g., Event@id, 'emsg' id) identifying the updated event instance/metadata sample to the corresponding Active Event Table. In some example implementations, the updated event may be added to the Event and Time Metadata buffer, and staled event may be deleted from the same buffer.

Step 7: Dispatch the updated event/metadata (e.g., message_data) at time ST, or immediately if the current presentation time is larger than ST.

The DASH client may add the updated event (e.g., Event@id, 'emsg' id) to corresponding Dispatched Event Table, once after the updated event is dispatched.

Optionally, the DASH client may further check if there is an entry of the updated event in the corresponding Active Event Table. If an entry exists, the DASH client may remove the entry from it.

FIG. 5c shows an example on-start processing logic.

The steps as described above for the common processing, on-receive processing, and on-start processing are for exemplary purpose only. Other implementations may include, for example, a subset of the steps.

In this disclosure, the term "field" or "attribute" may be interchangeable for Inband events, MPD events, and timed metadata samples. An event may generally refer to an MPD event, an inband event, a timed metadata sample, unless otherwise specified.

In some example implementations, the inband event and the MPD event are each identified by or associated with a scheme identifier, the scheme identifier may include, for example, a scheme identifier Uniform Resource Identifier (URI).

Figure 6:
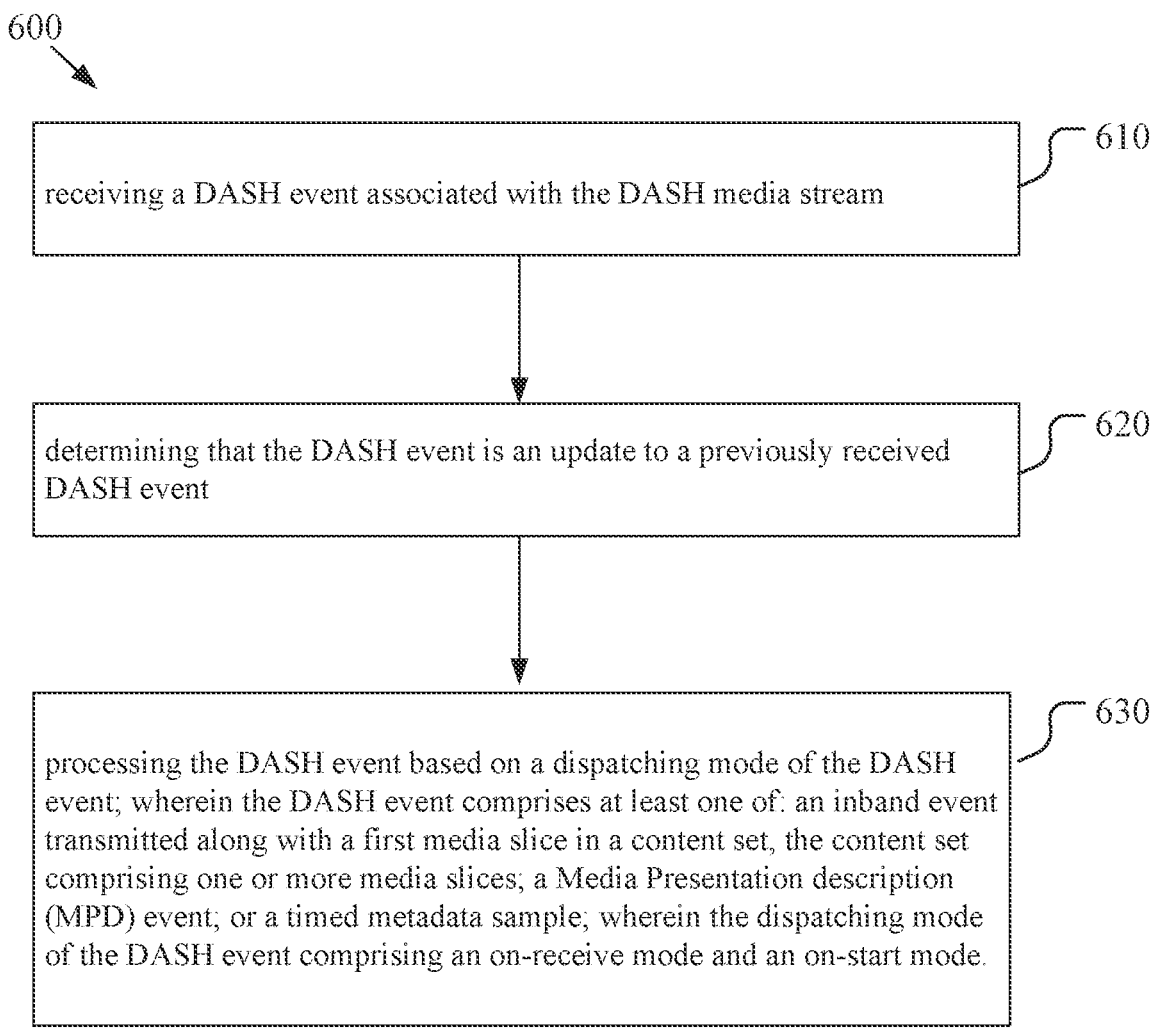
FIG. 6 shows flow charts of a method according to an example embodiment of the disclosure.

Embodiments in this disclosure apply to DASH and other media streaming technologies/standards. FIG. 6 shows an exemplary method 600 for processing a media stream, such as a DASH media stream. The method may be performed by a DASH client hosted by a media streaming device in a media streaming system, and the method 600 may include a portion or all of the following step: step 610: receiving a DASH event associated with the DASH media stream; step 620: determining that the DASH event is an update to a previously received DASH event; and step 630: processing the DASH event based on a dispatching mode of the DASH event; wherein the DASH event comprises at least one of: an inband event transmitted along with a first media slice in a content set, the content set comprising one or more media slices; a Media Presentation description (MPD) event; or a timed metadata sample; wherein the dispatching mode of the DASH event comprising an on-receive mode and an on-start mode.

Embodiments in the disclosure may be used separately or combined in any order. Further, each of the methods (or embodiments) and the DASH client may be implemented by processing circuitry (e.g., one or more processors or one or more integrated circuits). In one example, the one or more processors execute a program that is stored in a non-transitory computer-readable medium. Embodiments in the disclosure may be applied to DASH and/or other media streaming technologies/standard.

The techniques described above, can be implemented as computer software using computer-readable instructions and physically stored in one or more computer-readable media. For example, FIG. 7 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
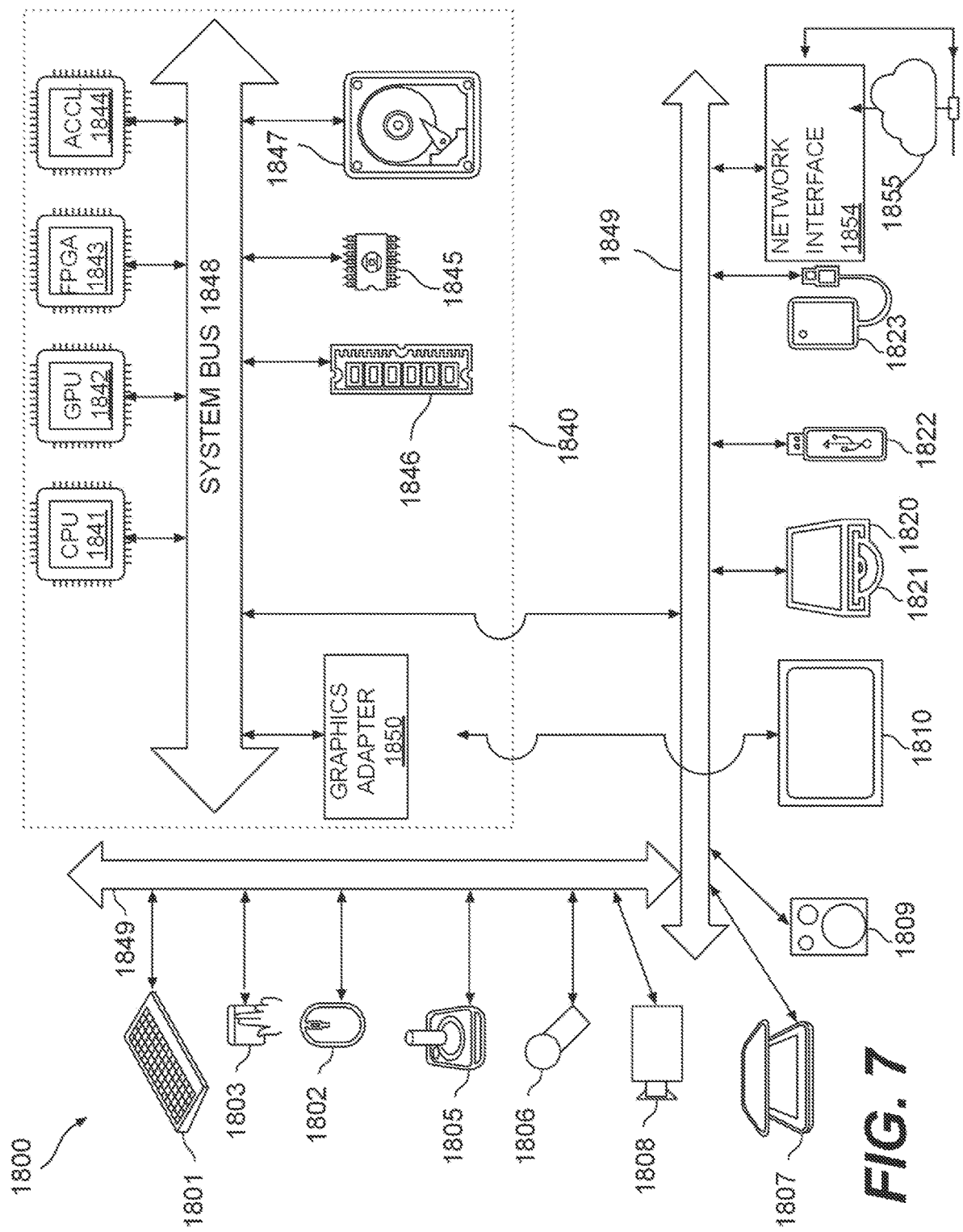
FIG. 7 shows a schematic illustration of a computer system in accordance with example embodiments of the disclosure.

The components shown in FIG. 7 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition to or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing a Dynamic Adaptive Streaming over HTTP (DASH) media stream, performed by a DASH client hosted by a media streaming device in a media streaming system, the method comprising:
   receiving a DASH event associated with the DASH media stream;
   determining that the DASH event is an update to a previously received DASH event; and
   in response to the previously received DASH event being in an active event list associated with a same pair of scheme identifier and value as the event, deleting the previously received DASH event from the active event list, the active event list comprising a list of events to be dispatched;
   wherein the DASH event comprises at least one of:
   an inband event transmitted along with a first media slice in a content set, the content set comprising one or more media slices;
   a Media Presentation description (MPD) event; or
   a timed metadata sample;
   wherein a dispatching mode of the DASH event comprising an on-start mode.

2. The method of claim 1, wherein determining that the event is the update to the previously received event comprises:
   determining the event to be an updated version based on one of: a status field of the event; or a flag associated with the event; and
   in response to a combination of fields in the event matching with the combination of fields in the previously received event, determining that the event is the update to the previously received event, wherein the combination of fields comprising at least one of: a scheme identifier field; a value field; or an ID field.

3. The method of claim 2, wherein determining the event to be the updated version comprises:
   in response to the event being an MPD event, determining the event to be the updated version based on a status filed of the event; or
   in response to the event being an inband event, determining the event to be the updated version based on a flag associated with the event.

4. The method of claim 1, wherein, a current media presentation time of the media stream is smaller than a starting time of the event, and the method further comprises:
   in response to the previously received event being not in a dispatched event list associated with the same pair of scheme identifier and value as the event, adding the event to the active event list, wherein the dispatched event list comprising a list of events having been dispatched.

5. The method of claim 1, further comprising:
   in response to the previously received event being in a dispatched event list associated with the same pair of scheme identifier and value as the event, stopping processing the event.

6. The method of claim 4, further comprising:
   dispatching the event at the staring time of the event; and
   adding the event to the dispatched event list associated with the same pair of scheme identifier and value as the event.

7. The method of claim 6, wherein after dispatching the event at the staring time of the event, the method further comprises:
   deleting the event from the active event list.

8. The method of claim 1, wherein, a current media presentation time of the media stream is larger than a start time of the event, and the method further comprises:
   deriving an end time of the event, based on the start time of the event and a duration of the event;
   in response to a current media presentation time of the media stream being smaller than the end time of the event and the previously received event being not in a dispatched event list associated with a same pair of scheme identifier and value as the event:
   dispatching the event at the staring time of the event, to an application subscribed to an event type the event belonging to; and adding the event to the dispatched event list associated with the same pair of scheme identifier and value as the event.

9. The method of claim 8, wherein:
before dispatching the event at the staring time of the event, the method further comprises:
adding the event to the active event list; and
after dispatching the event at the staring time of the event, the method further comprises:
deleting the event from the active event list.

10. A device for processing a DASH media stream, the device comprising a memory for storing computer instructions and a processor in communication with the memory, wherein, when the processor executes the computer instructions, the processor is configured to cause the device to:
receive a DASH event associated with the DASH media stream;
determine that the DASH event is an update to a previously received DASH event; and
in response to the previously received DASH event being in an active event list associated with a same pair of scheme identifier and value as the event, delete the previously received DASH event from the active event list, the active event list comprising a list of events to be dispatched;
wherein the DASH event comprises at least one of:
an inband event transmitted along with a first media slice in a content set, the content set comprising one or more media slices;
a Media Presentation description (MPD) event; or
a timed metadata sample;
wherein a dispatching mode of the DASH event comprising an on-start mode.

11. The device of claim 10, wherein, when the processor is configured to cause the device to determine that the event is the update to the previously received event, the processor is configured to cause the device to:
determine the event to be an updated version based on one of: a status field of the event; or a flag associated with the event; and
in response to a combination of fields in the event matching with the combination of fields in the previously received event, determine that the event is the update to the previously received event, wherein the combination of fields comprising at least one of: a scheme identifier field; a value field; or an ID field.

12. The device of claim 11, wherein, when the processor is configured to cause the device to determine the event to be the updated version, the processor is configured to cause the device to:
in response to the event being an MPD event, determine the event to be the updated version based on a status filed of the event; or
in response to the event being an inband event, determine the event to be the updated version based on a flag associated with the event.

13. The device of claim 10, wherein, a current media presentation time of the media stream is smaller than a starting time of the event, and wherein, when the processor executes the computer instructions, the processor is configured to further cause the device to:
in response to the previously received event being not in a dispatched event list associated with the same pair of scheme identifier and value as the event, add the event to the active event list, wherein the dispatched event list comprising a list of events having been dispatched.

14. The device of claim 10, wherein, when the processor executes the computer instructions, the processor is configured to further cause the device to:
in response to the previously received event being in a dispatched event list associated with the same pair of scheme identifier and value as the event, stop processing the event.

15. The device of claim 13, wherein, when the processor executes the computer instructions, the processor is configured to further cause the device to:
dispatch the event at the staring time of the event; and
add the event to the dispatched event list associated with the same pair of scheme identifier and value as the event.

16. A non-transitory storage medium for storing computer readable instructions, the computer readable instructions, when executed by a processor in a device for processing a DASH media stream, causing the processor to:
receive a DASH event associated with the DASH media stream;
determine that the DASH event is an update to a previously received DASH event; and
in response to the previously received DASH event being in an active event list associated with a same pair of scheme identifier and value as the event, delete the previously received DASH event from the active event list, the active event list comprising a list of events to be dispatched;
wherein the DASH event comprises at least one of:
an inband event transmitted along with a first media slice in a content set, the content set comprising one or more media slices;
a Media Presentation description (MPD) event; or
a timed metadata sample;
wherein a dispatching mode of the DASH event comprising an on-start mode.

17. The non-transitory storage medium of claim 16, wherein, when the computer readable instructions cause the processor to determine that the event is the update to the previously received event, the computer readable instructions cause the processor to:
determine the event to be an updated version based on one of: a status field of the event; or a flag associated with the event; and
in response to a combination of fields in the event matching with the combination of fields in the previously received event, determine that the event is the update to the previously received event, wherein the combination of fields comprising at least one of: a scheme identifier field; a value field; or an ID field.

18. The device of claim 15, wherein, after the processor is configured to cause the device to dispatch the event at the staring time of the event, the processor is configured to further cause the device to:
delete the event from the active event list.

19. The device of claim 10, wherein a current media presentation time of the media stream is larger than a start time of the event, and wherein, when the processor executes the computer instructions, the processor is configured to further cause the device to:
derive an end time of the event, based on the start time of the event and a duration of the event;
in response to a current media presentation time of the media stream being smaller than the end time of the event and the previously received event being not in a dispatched event list associated with a same pair of scheme identifier and value as the event:

dispatch the event at the staring time of the event, to an application subscribed to an event type the event belonging to; and add the event to the dispatched event list associated with the same pair of scheme identifier and value as the event.

20. The device of claim 19, wherein:

before the processor is configured to cause the device to dispatch the event at the staring time of the event, the processor is configured to further cause the device to: add the event to the active event list; and after the processor is configured to cause the device to dispatch the event at the staring time of the event, the processor is configured to further cause the device to: delete the event from the active event list.

* * * * *